Sept. 7, 1965   B. W. GUSTAFSON ETAL   3,204,582
DIE ANNULUS FOR MACHINE FOR WAFERING HAY AND LIKE FORAGE CROPS
Filed Oct. 30, 1963   2 Sheets-Sheet 1

INVENTORS
B. W. GUSTAFSON
G. SOTEROPULOS
H. E. de BUHR

INVENTORS
B. W. GUSTAFSON
G. SOTEROPULOS
H. E. de BUHR

United States Patent Office 3,204,582
Patented Sept. 7, 1965

3,204,582
DIE ANNULUS FOR MACHINE FOR WAFERING HAY AND LIKE FORAGE CROPS
Blaine W. Gustafson, Gust Soteropulos, and Harold E. de Buhr, Ottumwa, Iowa, assignors to Deere & Company, Moline, Ill., a corporation of Delaware
Filed Oct. 30, 1963, Ser. No. 320,020
7 Claims. (Cl. 107—14)

This invention relates to a machine for wafering hay and like forage crops and more particularly to improvements in the extrusion die for increasing the effectiveness, capacity and efficiency of the machine and for producing a quality wafer.

A hay wafering machine, as it has become known in the relatively recent art on the subject, is primarily a mobile field machine, intended in some areas to replace, or at least supplement, the conventional automatic baler, from which it distinguishes in many respects; although, it operates on substantially the same type of crops. For example, whereas a baler will pick up hay and the like from previously cut and windrowed crops and will form same into individual bales of a size in the range of 14" x 18" x 32" and a unit density in the range of eight to ten pounds per cubic foot, a wafering machine, operating on similar windrows, is designed to produce wafers of rectangular cross-section, typically in the size range of ⅞" x ⅞" to 1½" x 1½" x random length (from ¾" to 2") and having a bulk density in the order of twenty-five to forty-five pounds per cubic foot and a unit density of around forty to sixty-five pounds per cubic foot. Intermediate these two is the so-called high-density baler, producing bales in the size range of 12" x 14" x 32" and having a unit density of approximately sixteen pounds per cubic foot. The typical standard baler and the high-density baler are quite alike in that the compacting pressures are derived from plungers, and some form of tying medium, normally twine or wire, is used.

In a wafering machine, compaction is accomplished by other methods, the rotary type currently showing the best results; although, some reciprocating types are known; and these have in common the dependence on the wafer itself to retain its own formation; that is to say, no tying medium is used. In some cases, some form of edible, fluid binder may be introduced to the crop while it is being wafered. The principal advantage of a wafering machine over a baler lies in the nature of the product, which is more easily handled, stored, fed, ground, etc.

The typical wafering machine of the rotary character noted above utilizes an annular die having a plurality of uniformly circumferentially spaced radial die cells having their inlet ends opening in common at what may be regarded as a circular track about which one or more rolling press wheels orbit in planetary fashion to force the hay or like crops successively into the die cells, ultimately compacting same and forming what may be considered an extrusion product. In machines involving a reversal of parts, the die ring may be rotated while the press wheel carrier is fixed and the press wheel rotates but about a fixed axis on the carrier. Since the fixed-die, rotating-press-wheel-type is the better known machine, the present disclosure will proceed on that basis, recognizing of course that the principles involved are equally applicable to the other type.

Although there are other machines operating on the roller-die-extrusion principle; viz., the so-called pellet mills used to pellet feed for livestock, poultry, cats, dogs, etc., attempts of designers, in the field of wafering hay and like crops, to draw on pelleting principles have so far proven futile because of the vast differences in environmental characteristics; e.g., pelleted material is initially relatively dry, finely ground, of uniform moisture content, is fed into the pelleting machine at a carefully controlled, uniform rate, is pre-treated before pelleting, pelleting pressures are extremely high (ranging from 8,000 to 10,000 p.s.i. and up to 14,000 p.s.i. and higher as compared with wafering pressures of 8,000 to 10,000 p.s.i. and downward to as low as 3,000 p.s.i.), the end product is small (⅛" to ⅜" diameters and random lengths of ¼" to 1½"), hard and of uniform appearance. Hence, the art of hay wafering, presenting new problems, has developed along lines specifically different from those of balers and pellet mills.

In the present state of the art, wafering machines are limited mainly to the wafering of alfalfa and similar legumes and encounter some difficulty in handling grasses or mixtures of grasses and legumes. The ability of a wafering machine to perform efficiently and to produce adequate wafers is also affected by such factors as crop moisture, windrow size and density, length of cut, etc. Significantly good results are obtained where the crop has been cut and then field-cured to a moisture content of 15% or less, with the moisture evenly distributed in the stems and leaves. Rewetting of the crops upon feeding to the die, up to 20%, may be required for good wafering.

In any event, the cross-sectional size of the die cells determines the cross-sectional size, of course, of the wafer. Although die cells may range in length from 2½" to 12", depending upon the cross-sectional dimensions of the cell, the length of the wafer depends upon the extent to which the material is extruded from the respective cells before breaking off. In some cases, breaker means are provided to break the wafers off after they have attained a predetermined length, say, two inches or so. In other instances, the wafers break off because of their own weight and thus have random lengths as already noted. In this respect, it will be clear that the material compacted into the die cells will be in the form of successive charges as the rolling press wheel passes over the inlet ends of the cells and forces quantities of the material into the cells, and each charge of hay is normally less than a full wafer, so that it is unlikely that a die cell will be completely filled from one end to the other during one pass of the press wheel. Consequently, each wafer will be made up of several successive charges, and the quality of the wafer depends not only upon the compaction of each charge but also upon the ability of each charge to adhere to the previous and following charges, and this in turn will depend upon many factors, largely those residing in the structure and design of the die cells as to cross-section, length, ratio of length to cross-section, frictional resistance between the walls and the material, etc. Where these factors are improperly controlled—reflected largely by poor die design—the charges themselves will be improperly formed, and, more significantly, successive charges will not adhere together and the wafers will break apart at the junctions between charges, resulting in fragmentary wafers, excessive dust and chaff and unusable "fines," which is not only a waste of material but is undesirable from the standpoint of handling and feeding.

Further, the prior art dealing with rotary or annular die wafering machines has unanimously sought the answer to these problems by "choking" the die cells; viz., providing a restriction or reduction in the cross-sectional area of each cell at or near its outlet. In many known machines, the restriction or convergence of cell walls is built into the die annulus, and in other instances one or more walls of each cell is made adjustable so that the initial convergence can be increased, the rationale being that such adjustment would increase the frictional resistance of the cell walls to the passage of material therethrough in accordance with variations in crop characteristics, e.g., moisture content, type, etc.

According to the present invention, the principle of choking or converging the die cells is departed from, and, instead, a die annulus is provided in which each cell has a built-in, fixed divergence (as distinguished from convergence) in cross-sectional area from its inlet end to its outlet end; in other words, the outlet end is larger than the inlet end by a carefully developed amount related to cell area and length. It is a significant object of this invention to obtain this divergence by providing each cell with four walls, making a cell of rectangular cross-section, at least one opposed pair of walls being non-parallel; i.e., in divergent relation, and the other opposed pair of walls having such relationship to each other that the transverse dimension therebetween at the outlet end of the cell is at least equal to that at the inlet end; i.e., these latter walls do not converge but may, like the first pair of walls, diverge. Stated broadly, this object of the invention intends that the cross-sectional area of each cell increases uniformly from the inlet to the outlet thereof.

It is a further object of the invention to provide an annular die in which the above divergence, in each cell, is achieved on a pair of opposed walls representing the circumferentially spaced and opposed faces of neighboring radial spacer elements, which spacer elements are not only identical to each other but each is symmetrical from side to side or about its principal or lengthwise axis, which axis is coincident with a radius of the annulus. Hence, each spacer element can be removed from the die assembly and reinstalled in a position turned 180° about its axis so as to present a new inner shear edge at the press wheel track to shear the crops rolled over by the press wheel.

A still further object, in the area under concern, is the provision of each die cell having dimensional and shape characteristics such that the cross-sectional size at the inlet end is on the order of ⅞" x ⅞" to 1½" x 1½", the cross-sectional shape is rectangular (including square), the length of the cell is on the order of 3½ to 4½ times the cross-sectional area, and the cross-sectional area of the outlet end is larger than that of the inlet end by an amount that would result from a divergence between a pair of opposed cell walls in the range of .010" to .030" per six inches of die cell length. Stated otherwise, the area of the outlet end of the cell should exceed that of the inlet end by approximately not more than 3%, preferably in the range of .7% to 2½%.

The foregoing and other important objects and desirable features inherent in and encompassed by the invention will become apparent as a preferred embodiment thereof is disclosed in detail, by way of example, in the ensuing description and accompanying sheets of drawings, the figures of which are described below.

Figure 1:
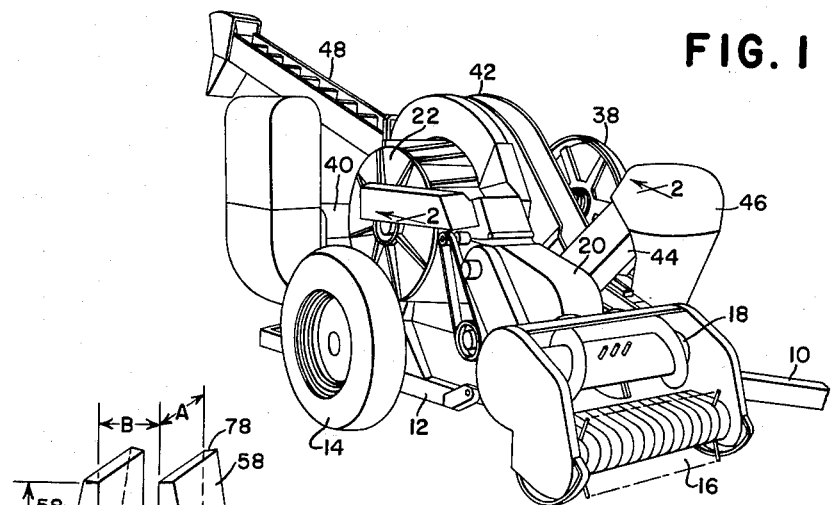
FIG. 1 is a perspective illustrating a representative type of field wafering machine.

As set forth previously herein, the greatest value in a successful hay wafering machine lies in its embodiment as a field machine as distinguished from a stationary or mill type apparatus. Such field machine may take many forms, and that shown in FIG. 1 is but representative. This is here illustrated as being of the type drawn by a tractor (not shown) and the numeral 10 designates a draft tongue carried by the main frame of the machine, indicated by the numeral 12. This frame is carried at opposite sides by ground wheels, one of which appears at 14. The machine travels from left to right as seen in the drawing and is equipped with what may be regarded as a conventional pickup mechanism 16 of the type commonly found in pickup balers, for example. The previously cut and windrowed crop is picked up by the pickup mechanism, is transferred rearwardly to a laterally compressing auger 18 and moves rearwardly through a feeder house 20 for delivery to the front lower quarter of an auger housing 22 here disposed on a transverse axis as respects the line of advance of the machine.

Figure 2:
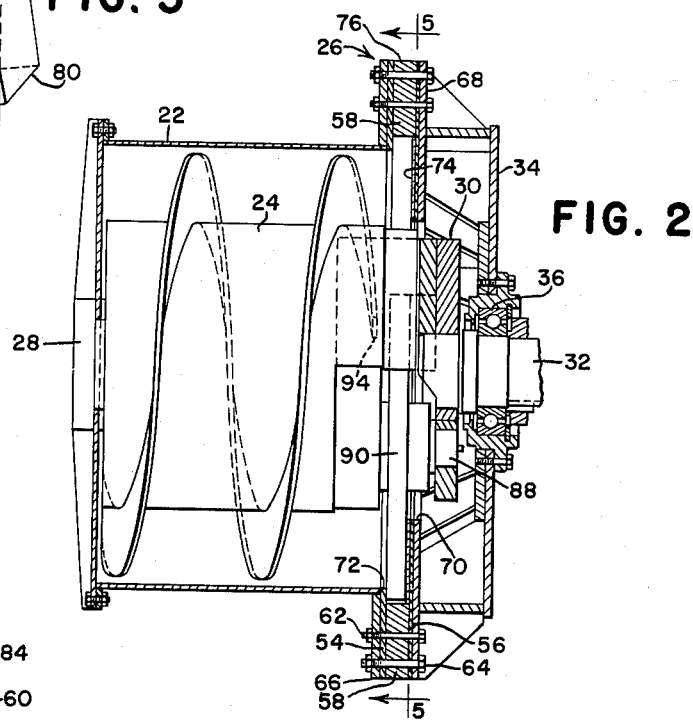
FIG. 2 is an enlarged section taken in a vertical plane including the transverse line 2—2 in FIG. 1.

FIG. 2 shows that a single-flight auger 24 rotates in the housing 22 to deliver material from left to right as seen in the drawing to a die annulus, indicated in its entirety by the numeral 26. The auger is journaled at its left-hand end (as seen in FIG. 2; its right-hand end in the machine) by a suitable bearing 28 and at its opposite end is combined coaxially with and connected to a press wheel carrier 30 to which is rigidly coaxially connected an input shaft 32. The die annulus 26 has rigidly associated therewith outboard structure 34 which includes a bearing 36 for journaling the input shaft 32. FIG. 1 shows at 38 a flywheel which is keyed to the shaft 32 and which may be driven from any suitable source of power. In this case, an internal combustion engine, indicated at 40, is carried by the frame 12 and its output is belted to the flywheel 38 in any suitable manner not material here.

FIG. 1 also shows that the die annulus 26 and outboard structure 34 is enclosed at 42. This represents not only shielding structure but a part of the means for gathering the extruded wafers and controlling their delivery to a first conveyor 44 which leads upwardly and forwardly to a hopper 46 which in turn discharges downwardly to a wagon elevator 48 that inclines upwardly and rearwardly. As is known to those versed in the art, the wafers are delivered by such elevator to a trailing wagon or other drawn receptacle. This is largely conventional practice and therefore is not described in detail.

Figure 5:
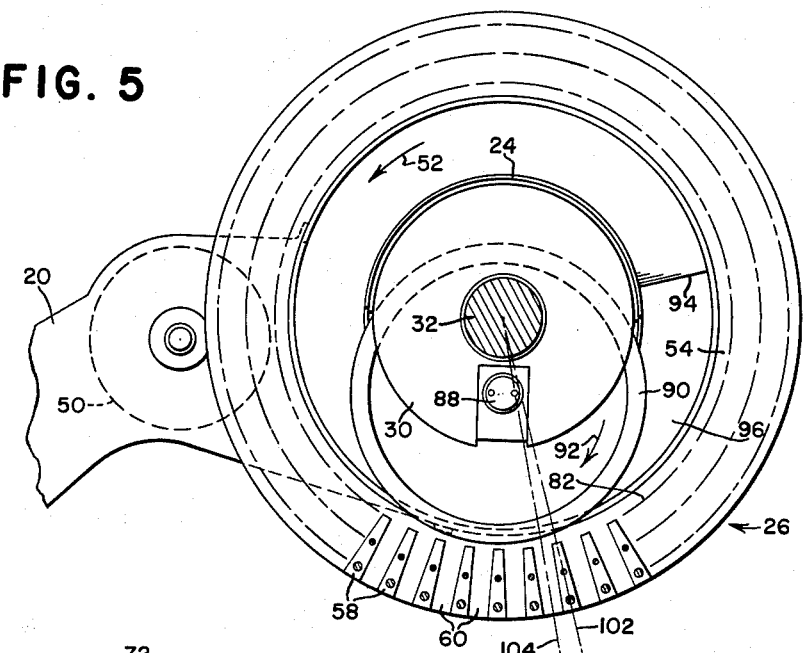
FIG. 5 is a section on the line 5—5 of FIG. 2 and including portions of means for introducing material to the auger housing from which it ultimately reaches the die annulus.

Looking now at FIG. 5 and observing that the section line 5—5 results in a disposition of this figure so that the forward end of the machine is at the reader's left, it will be seen that the feeder house 20 contains any suitable rotary feeder, as at 50, which rotates in a counterclockwise direction to deliver material to the interior of the auger housing 22. The auger 24 also rotates in a counterclockwise direction (arrow 52) and, as previously stated, the augered material is delivered to the interior of the die annulus 26.

This annulus is here shown as being made up of a pair of radial sides 54 and 56 and a plurality of similar, uniformly circumferentially spaced radial spacer elements 58 which provide the annulus with a like plurality of radial die cells 60. The spacer elements are rigidly secured to the radial sides 54 and 56, as by a plurality of bolts 62 and 64 which, in this case, serve also to secure the annulus to inner and outer flanges 66 and 68 rigidly secured respectively to the auger housing 22 and outboard structure 34. As will be seen from FIG. 2, the structure 34 encloses the die annulus from the right (as seen by the reader). It will be further seen that the flange 68 is carried inwardly to a relatively small inside diameter to provide an opening 70, whereas the inner radial side 54 of the annulus has a larger inside diameter, at 72, here coincident with the inside diameter of the auger housing 22. Additional rings, as at 74, may be concentrically secured to and alongside the opposite radial side 56.

Figure 6:
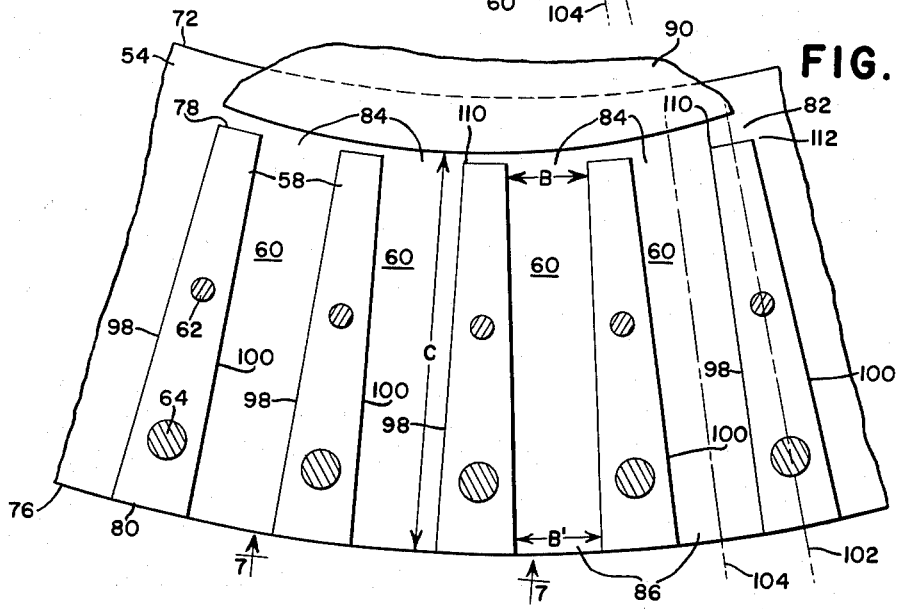
FIG. 6 is an enlarged fragmentary view of a bottom portion of FIG. 5, illustrating neighboring die cells.

As previously noted, the radial sides or rings 54 and 56 preferably have a common outside diameter, thereby giving the die annulus 26 an outer periphery, denoted at 76 in FIGS. 2 and 6. Each spacer element or die block 58 has opposite inner and outer ends 78 and 80 respectively. The outer ends are substantially co-terminal with the outer periphery 76, but the length of each die block is such that its inner end 78 is short of the circle of the inside diameter 72 of the inner radial side 74. Since the central opening at 70 has a smaller inside diameter than that at 72, it follows that this likewise is radially inwardly of the inner terminal ends of the die blocks or spacer elements 78, thus establishing a track or annular channel 82, having its bottom represented by the inner ends 78 of the spacer elements and the inlet ends 84 of the die cells 60, with its sides being formed by those portions of the radial sides 54 and 56 which extend radially inwardly beyond the circle on which lie the ends of the spacer elements 78 and inlets 84 of the die cells.

The press wheel carrier 30, previously described as being coaxially rigidly fixed to and therefore rotatable with the auger 24, carries a press wheel shaft 88 which is of course parallel and eccentric to the input shaft 32. This shaft journals thereon a press wheel 90, the peripheral portion of which runs in the previously described track 82. As best seen in FIGS. 5 and 6 there is a limited amount of radial clearance between the periphery of the press wheel and the bottom of the track as represented by the inner ends 78 of the spacer elements and the inlet ends of the die cells 60. In FIG. 5, the circle on which lie the ends just mentioned is shown by the dot-dash line 82 which is of course the previously described track. It will be seen, then, that material augered into the interior of the annulus 26 is rolled over by the press wheel 90 as the press wheel shaft 88 orbits about the axis of the annulus, the press wheel 90 of course rolling in a clockwise direction as shown by the arrow 92 (FIG. 5). The terminal end of the flight on the auger 24, designated by the numeral 94, is "timed" with the press wheel 90 so that it delivers material just ahead of the press wheel in the "crescent" area or bight 96 to be rolled over by the wheel and consequently to be forced into the inlet ends 84 of the die cells 60.

In a properly designed machine, the incoming material will be a ribbon made up of a composite of stems and leaves, delivered continuously by the auger to the "crescent" 96, it being understood of course that the crescent changes position counterclockwise about the interior of the annulus as does, of course, the press wheel 90. The incoming material is therefore continuously forced into the inlet ends of the die cells 60 as the press wheel rolls and orbits and, as already explained, the material will enter the inlet ends of the die cells as charges of smaller volume than that of a full or complete wafer. As the material continues to be fed and to be rolled over by the press wheel, these charges will accumulate in the respective cells and will ultimately exit at the outlet ends 82 of the cells as wafers. In exterior areas at the lower portion of the annulus, the extrusions will become quite long, because they are decreasingly affected by gravity as the bottom center of the annulus is approached. Accordingly, some form of breaker means (not shown here) may be provided to break the wafers off at lengths on the order of those already discussed. At diametrically opposite portions of the die in a horizontal plane, the forces of gravity will tend to cause the wafers to break off. As the upper portion of the die annulus is reached, breaker means may again be required. Where breaker means are provided, they are enclosed within the shielding structure 42 (FIG. 1). Here again, this is conventional structure and therefore is not described or illustrated in detail.

Figure 3:
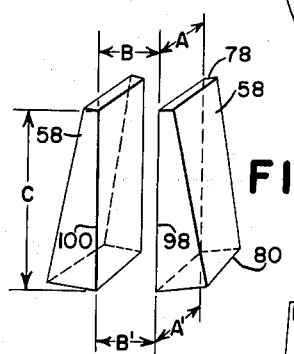
FIG. 3 is a schematic illustration of a pair of neighboring spacer elements and illustrating the dimensional characteristics of the die cell enclosed or formed thereby.
Figure 4:
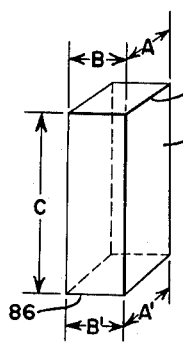
FIG. 4 is a schematic illustration of such die cell.

FIG. 3 illustrates schematically a neighboring pair of spacer elements 58 defining between them a die cell 60, shown schematically by itself in FIG. 4. Each spacer element, in addition to its opposite ends 78 and 80, has opposite sides 98 and 100. These sides converge radially inwardly, and, in the instance illustrated here, the principal or lengthwise axis of each spacer element lies on a radius of the annulus, the axis of the annulus being of course that of the input shaft 34, carrier 30 and auger 24. A single such radial line is shown by way of example at 102 in FIGS. 5 and 6. Thus it will be seen that opposite sides 98 and 100 of each spacer element are in radially inwardly convergent relationship to such radius.

It is also seen that the principal axis or center line of each die cell 60 is on a radius of the annulus. This is represented, in a single instance, by the line 104 in FIGS. 5 and 6.

The significant improvement achieved by the present invention resides in dimensional and shape characteristics of the die cells so as to produce commercially usable wafers at a rate and cost commensurate with high and efficient production. This will be best understood from an examination of FIGS. 3 and 4 in connection with FIG. 6.

FIG. 4 shows a die cell 60 in an isometric view and here representative of a square cross-section. One dimension at its inlet end, measured axially of the annulus 26, is represented by the letter A. The other dimension, which will be circumferentially of the annulus is represented by the letter B. By way of example, both dimensions may be taken as 1½". At its opposite or outlet end 86, the die cell is shown as having corresponding dimensions A' and B'. A and A' may be regarded as equal. B' is greater than B, as will be pointed out hereinafter. The length of the cell from end to end is represented by the dimension C.

Figure 7:
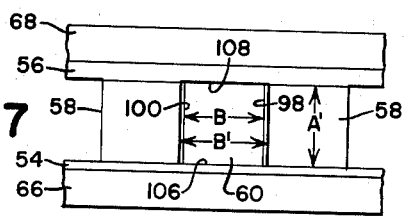
FIG. 7 is an elevation as seen along the line 7—7 of FIG. 6.

Since the die cell 60 of FIG. 4 is formed by the neighboring pair of spacer elements 58 of FIG. 3, it follows that the same dimensions can be used in FIG. 3. That is to say, the circumferentially opposed flat interior surfaces 98 and 100 of the neighboring spacers 58 afford two opposed walls of the square die cell, whereas additional walls 106 and 108 (FIG. 7) are provided by the flat interior radial surfaces of portions of the radial sides 54 and 56 which intervene between the two spacers just referred to. In the assembled fragmentary elevation in FIG. 7, the dimensions A', B and B' appear. B is of course the smaller dimension of the two (B and B') and represents the circumferential dimension at the inlet end of the cell 60. B' is the larger dimension at the outlet end of the cell.

Since dimension B' is larger than B, it follows that the cross-sectional area of the cell at its outlet end 86 is greater than that at the inlet end 84. This is accomplished in the present case by providing the cell 60 with two opposed walls which are in radially outwardly divergent relationship to each other. The two walls selected in this case are the walls afforded by the circumferentially facing spacer element surfaces 98 and 100. In other words, these surfaces are not parallel to the radius 104, but instead diverge radially outwardly away from the line 104. Consequently, they diverge radially outwardly relative to each other. It will of course occur that one of the surfaces, e.g., 98, could be parallel to the line 104 while all the divergence would be built into the surface 100. However, it is preferred that each spacer element by symmetrical about its axis 102 so that it can be readily removed from the die assembly and reversed or turned about this axis in an amount of 180° so as to interchange the shear edges at its inner end 78. This will be best understood by looking at FIGS. 5 and 6 and noting that the press wheel 90, although rolling in the direction of the arrow 92, is carried in a counterclockwise direction, since its mounting shaft 88 rotates with the auger and carrier 30 in the direction of the arrow 52. Hence, edges at the inner ends 78 of the spacers or die blocks that will be contacted primarily by the periphery of the press wheel will be those as represented by the numeral 110. During usage of the machine, the edges 110 will ultimately become rounded and the shearing action will depreciate. At that time, since the spacer elements are symmetrical, they can be turned about to present a "new" edge, as at 112, to the shearing area.

In keeping with that phase of the invention which gives the outlet end 86 of each die cell a cross-sectional area greater than that at the inlet end 84, the other pair of walls as provided by the radial side interior surface portions 106 and 108 are such that the dimension A' is at least equal to the dimension A. Stated otherwise, the walls 108 and 106 may be parallel or may diverge radially outwardly but should not converge, since this will apply the "choke" already exploited by the prior art.

A further and significant aspect of the invention is that the excess of cross-sectional area at the outlet end of each die cell over that at the inlet end is related to cross-sectional size in general and this in turn is further related to the length of the cell. In other words, there is a definite relationship among the areas A times B and A' times B' and length C, in this case established by the divergence between the cell walls 98 and 100. In a die cell in which the area A times B is relatively small, for example 7/8″ x 7/8″, the length C can be shorter than it would be if the area A times B were larger, for example 1½″ x 1½″. A suitable die cell design will result where the length C equals 3½ to 4½ times area A times B. By way of example and to illustrate die cell designs in which excellent results are obtainable, a die cell having an inlet area of 7/8″ x 7/8″ will have a length of between 2.7″ and 3.4″ (approximately). A die cell having an inlet end area of 1½″ x 1½″ would have a length between 8″ and 10″ (approximately). Excellent results are achieved with a die annulus in which each cell has an inlet area of 1¼″ x 1¼″ and a die length 6″.

The foregoing area dimensions, which of course may be varied in a rectangular cell as distinguished from a perfect square, are selected on the basis of machine capacity and efficiency, together with manufacturing costs and animal acceptance. For example, experience has shown that wafers larger than 2″ x 2″ are unacceptable and in some cases cause choking of the animal. Smaller dimensions require machines of higher horsepower and further are too small for practical usage. The difference in cross-sectional area between that at the inlet end and that at the outlet end of each cell results from the previously described divergence of the pair of opposed walls 98 and 100. The amount of taper designed into each cell provides a die cell with sufficient resistance to the flow of material through the die to produce wafers with a unit density in the order of forty to sixty-five pounds per cubic foot. On the basis of the dimensions referred to above, this taper should be on the order of between .010″ to .020″ per 6 inches of length, and should extend the full length of the die; that is, from end to end. It will be seen from the foregoing that the amount of taper can be accomplished other than in the specific manner noted; that is to say, the taper could be divided among all or fewer than all of the four walls. Nevertheless, the amount of taper would be equivalent to that just stated. Stated otherwise, the area of the outlet end of the cell should exceed that of the inlet end by approximately not more than 3%, preferably in the range of .7% to 2½%.

Again, it will be seen that the length of the die varies directly as the cross-sectional area within the range described. This is because the smaller die sizes require less total resistance to flow in order to obtain the unit density desired, whereas the larger die involves more total resistance because of the increased cross-sectional dimensions.

Wafers produced in machines equipped with die structures designed on the basis of the foregoing have been unexpectedly good, and far superior to those produced by machines with choked die cells. The wafers are significantly better where the cross-sectional shape of the die is square, since both cross-sectional dimensions are equal.

Features and advantages other than those categorically enumerated will readily occur to those versed in the art, as will many modifications and alterations in the preferred embodiment disclosed, all of which may be achieved without departure from the spirit and scope of the invention.

What is claimed is:

1. In a machine for wafering hay and like forage crops, a wafering die comprising an annulus having inner and outer peripheries and axially spaced apart radial sides and a plurality of uniformly circumferentially spaced apart radial spacer elements disposed between said sides to form a like plurality of similar radial die cells opening at inlet and outlet ends respectively at said inner and outer peripheries, said sides extending radially inwardly of said inlet ends to form with the radially innermost ends of the spacer elements a press wheel track into which hay and like forage crops is introduced for extrusion outwardly through the cells for discharge as wafers at said outlet ends, said spacer elements having circumferentially opposite flat surfaces and the radial sides having flat axially opposed interior surfaces extending radially and circumferentially between the spacer elements to give each cell a rectangular section from end to end and each cell having a first pair of walls established by the surfaces of a pair of neighboring spacers and a second pair of walls established by the associated interior surfaces of said sides, said sides and spacer elements being rigidly joined together to fix the cross-sectional and lengthwise dimensions of the cells, each cell having at its inlet end circumferential and axial dimensions on the order of .875″ to 1.5″, each cell having a radial dimension on the order of 2.5″ to 11.0″, at least one pair of opposed walls of each cell diverging uniformly from its inlet end to its outlet end on a taper on the order of .010″ to .030″ per six inches of cell length so that one dimension at said outlet end is greater than the corresponding dimension at said inlet end, and the other dimension, at said outlet end being at least equal to the corresponding other dimension at said inlet end.

2. The invention defined in claim 1, in which: the diverging walls of each cell comprise the circumferentially opposed surfaces of the associated pair of neighboring spacer elements.

3. In a machine for wafering hay and like forage crops, a wafering die comprising an annulus having inner and outer peripheries and axially spaced apart radial sides and a plurality of uniformly circumferentially spaced apart radial spacer elements disposed between said sides to form a like plurality of similar radial die cells opening at inlet and outlet ends respectively at said inner and outer peripheries, said sides extending radially inwardly of said inlet ends to form with the radially innermost ends of the spacer elements a press wheel track into which hay and like forage crops is introduced for extrusion outwardly through the cells for discharge as wafers at said outlet ends, said spacer elements having circumferentially opposite flat surfaces and the radial sides having flat axially opposed interior surfaces extending radially and circumferentially between the spacer elements to give each cell a rectangular section from end to end and each cell having a first pair of walls established by the surfaces of a pair of neighboring spacers and a second pair of walls established by the associated interior surfaces of said sides, said sides and spacer elements being rigidly joined together to fix the cross-sectional and lengthwise dimensions of the cells, each cell having at its inlet end circumferential and axial dimensions on the order of 1.0″ to 1.25″, each cell having a radial dimension on the order of 4.0″ to 8.0″, at least one pair of opposed walls of each cell diverging uniformly from its inlet end to its outlet end on a taper on the order of .010″ to .030″ per six inches of cell length so that one dimension at said outlet end is greater than the corresponding dimension at said inlet end, and the other dimension at said outlet end being at least equal to the corresponding other dimension at said inlet end.

4. In a machine for wafering hay and like forage crops, a wafering die comprising an annulus having inner and outer peripheries and axially spaced apart radial sides and a plurality of uniformly circumferentially spaced apart radial spacer elements disposed between said sides to form a like plurality of similar radial die cells opening at inlet and outlet ends respectively at said inner and outer peripheries, said sides extending radially inwardly of said inlet ends to form with the radially innermost ends of the spacer elements a press wheel track into which hay and like forage crops is introduced for extrusion outwardly through the cells for discharge as wafers at said outlet ends, said spacer elements having circumferentially opposite flat surfaces and the radial sides having flat axially opposed interior surfaces extending radially and circumferentially between the spacer elements to give each cell a rectangular section from end to end and each cell having a first pair of walls established by the surfaces of a pair of neighboring spacers and a second pair of walls established by the associated interior surfaces of said sides, said sides and spacer elements being rigidly joined together to fix the cross-sectional and lengthwise dimensions of the cells, each cell having at its inlet end circumferential and axial dimensions on the order of 1.25" x 1.25", each cell having a radial dimension on the order of 5" to 7", at least one pair of opposed walls of each cell diverging uniformly from its inlet end to its outlet end on a taper on the order of .010" to .030" per six inches of cell length so that one dimension at said outlet end is greater than the corresponding dimension at said inlet end, and the other dimension at said outlet end being at least equal to the corresponding other dimension at said inlet end.

5. In a machine for wafering hay and like forage crops, a wafering die comprising an annulus having inner and outer peripheries and axially spaced apart radial sides and a plurality of uniformly circumferentially spaced apart radial spacer elements disposed between said sides to form a like plurality of similar radial die cells opening at inlet and outlet ends respectively at said inner and outer peripheries, said sides extending radially inwardly of said inlet ends to form with the radially innermost ends of the spacer elements a press wheel track into which hay and like forage crops is introduced for extrusion outwardly through the cells for discharge as wafers at said outlet ends, said spacer elements having circumferentially opposite flat surfaces and the radial sides having flat axially opposed interior surfaces extending radially and circumferentially between the spacer elements to give each cell a rectangular section from end to end and each cell having a first pair of walls established by the surfaces of a pair of neighboring spacers and a second pair of walls established by the associated interior surfaces of said sides, said sides and spacer elements being rigidly joined together to fix the cross-sectional and lengthwise dimensions of the cells, each cell having at its inlet end a cross-sectional area on the order of .750 to 2.25 square inches, each cell having a radial dimension in inches, on the order of 3½ to 4½ times said cross-sectional area, at least one pair of opposed walls of each cell diverging uniformly from its inlet end to its outlet end on a taper on the order of .010" to .030" per six inches of cell length to give said outlet end a larger cross-sectional area than its inlet end, one transverse dimension at said outlet end being greater than the corresponding dimension at said inlet end, and the other dimension at said outlet end being at least equal to the corresponding other dimension at said inlet end.

6. In a machine for wafering hay and like forage crops, a wafering die comprising an annulus having inner and outer peripheries and axially spaced apart radial sides and a plurality of uniformly circumferentially spaced apart radial spacer elements disposed between said sides to form a like plurality of similar radial die cells opening at inlet and outlet ends respectively at said inner and outer peripheries, said sides extending radially inwardly of said inlet ends to form with the radially innermost ends of the spacer elements a press wheel track into which hay and like forage crops is introduced for extrusion outwardly through the cells for discharge as wafers at said outlet ends, said spacer elements having circumferentially opposite flat surfaces and the radial sides having flat axially opposed interior surfaces extending radially and circumferentially between the spacer elements to give each cell a rectangular section from end to end and each cell having a first pair of walls established by the surfaces of a pair of neighboring spacers and a second pair of walls established by the associated interior surfaces of said sides, said sides and spacer elements being rigidly joined together to fix the cross-sectional and lengthwise dimensions of the cells, each cell having at its inlet end a cross-sectional area on the order of .750 to 2.25 square inches, each cell having a radial dimension in inches, on the order of 3½ to 4½ times said cross-sectional area, at least one pair of opposed walls of each cell diverging uniformly from its inlet end to its outlet end on a taper such that the area of the outlet end exceeds that of the inlet end by an amount in the range of .7% to 2½%, one transverse dimension at said outlet end being greater than the corresponding dimension at said inlet end, and the other dimension at said outlet end being at least equal to the corresponding other dimension at said inlet end.

7. In a machine for wafering hay and like forage crops, a wafering die comprising an annulus having inner and outer peripheries and axially spaced apart radial sides and a plurality of uniformly circumferentially spaced apart radial spacer elements disposed between said sides to form a like plurality of similar radial die cells opening at inlet and outlet ends respectively at said inner and outer peripheries, said sides extending radially inwardly of said inlet ends to form with the radially innermost ends of the spacer elements a press wheel track into which hay and like forage crops is introduced for extrusion outwardly through the cells for discharge as wafers at said outlet ends, said spacer elements having circumferentially opposite flat surfaces and the radial sides having flat axially opposed interior surfaces extending radially and circumferentially between the spacer elements to give each cell a rectangular section from end to end and each cell having a first pair of walls established by the surfaces of a pair of neighboring spacers and a second pair of walls established by the associated interior surfaces of said sides, said sides and spacer elements being rigidly joined together to fix the cross-sectional and lengthwise dimensions of the cells, each cell having at its inlet end circumferential and axial dimensions on the order of .875" to 1.5", each cell having a radial dimension on the order of 2.5" to 11.0", at least one pair of opposed walls of each cell diverging uniformly from its inlet end to its outlet end on a taper such that the area of the outlet end exceeds that of the inlet end by no more than approximately 1% to 2%, one transverse dimension at said outlet end being greater than the corresponding dimension at said inlet end, and the other dimension at said outlet end being at least equal to the corresponding other dimension at said inlet end.

References Cited by the Examiner

UNITED STATES PATENTS

| 315,772 | 11/19 | Rothermann | 25 |
| 1,909,228 | 5/33 | Sizer | 107—8.35 |
| 2,059,486 | 11/36 | Payne et al. | 18—12 |
| 2,902,715 | 9/59 | Norman | 18—12 |
| 3,129,458 | 4/64 | Mitchell | 18—12 |

FOREIGN PATENTS

| 315,772 | 11/19 | Germany. |
| 812,774 | 9/51 | Germany. |
| 790,236 | 2/58 | Great Britain. |

WALTER A. SCHEEL, *Primary Examiner.*